(12) United States Patent
Holl et al.

(10) Patent No.: US 8,690,087 B2
(45) Date of Patent: Apr. 8, 2014

(54) ROLLER MILL FOR COFFEE

(75) Inventors: Wolfgang Holl, Guderhandviertel (DE); Gunter Simon, Hamburg (DE)

(73) Assignee: Bauermeister Zerkleinerungstechnik GmbH, Norderstedt (DE)

( * ) Notice: Subject to any disclaimer, the term of this patent is extended or adjusted under 35 U.S.C. 154(b) by 269 days.

(21) Appl. No.: 13/210,932

(22) Filed: Aug. 16, 2011

(65) Prior Publication Data
US 2012/0037735 A1 Feb. 16, 2012

(30) Foreign Application Priority Data
Aug. 16, 2010 (EP) ..................................... 10172874

(51) Int. Cl.
*B02C 19/00* (2006.01)
(52) U.S. Cl.
USPC ............................. 241/30; 241/235; 241/293
(58) Field of Classification Search
USPC ..................................... 241/30, 235, 100, 293
See application file for complete search history.

(56) References Cited

U.S. PATENT DOCUMENTS 1,936,843 A * 11/1933 Jonsson .......................... 241/16
2,394,048 A 2/1946 Farfan

FOREIGN PATENT DOCUMENTS

| CN | 2 468 583 Y | 1/2002 |
| CN | 2 736 058 Y | 10/2005 |
| JP | 2007-185557 A | 7/2007 |
| WO | WO 2009/043590 A2 | 4/2009 |

* cited by examiner

*Primary Examiner* — Mark Rosenbaum
(74) *Attorney, Agent, or Firm* — Norman B. Thot

(57) ABSTRACT

The present invention relates to a roller mill for coffee, a method for grinding coffee, and an application of grinding rollers for grinding coffee. In order to grind coffee, conventionally metal rollers are used which are subject to heavy wear and adversely affect the taste of the coffee. The object of the invention is to provide a roller mill for coffee, a method of grinding coffee and a corresponding application thereof that avoids these disadvantages. This is achieved by means of a roller mill for coffee with grinding rollers in opposite directions and having granite surfaces at a peripheral velocity ratio of the rollers 1:1.5 to 1.4, and by means of a corresponding application and corresponding method.

16 Claims, 1 Drawing Sheet

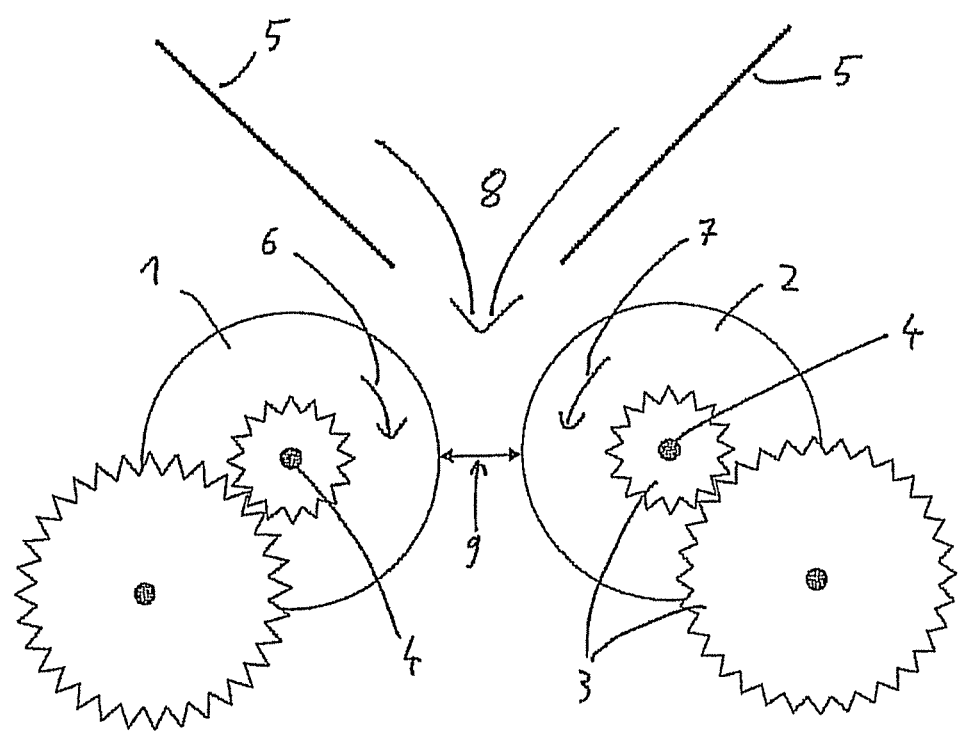

ROLLER MILL FOR COFFEE

BACKGROUND OF THE INVENTION

1. Technical Field

The present invention relates to a roller mill for coffee, a method for grinding coffee, and an application of a roller mill to grind coffee.

2. Background Information

Numerous roller mills are known from the prior art. It is also known to use roller mills to grind coffee.

Therein, these must be differentiated into roller mills with two rolls and so-called three-roll mills.

Three-roll mills, which are characterized in that they comprise three rollers with two grinding gaps found therebetween, can only be used for crushing viscous liquids or pastes, since the principle thereof is based on transporting the mass clinging to the bottom of the middle roller into the second grinding gap. Such three-roll mills are used for example to manufacture chocolate. Various rollers may be used therein. For example, metal or stone rollers are known in three-roll mills.

Since three-roll mills can only be operated with pasty masses, which cling onto the bottom of the middle roller, the grinding forces that arise herein are comparatively low. Homogenization, ventilation, dispersion and/or fine pulverization are achieved rather than grinding.

Also known are roller mills wherein only two rollers are used, which pull the pasty mass that is to be homogenized from a storage container bottom-up through the grinding gap. Here again it is essential that the pasty mass exhibit a certain adhesion to the grinding rollers. Homogenization, ventilation, dispersion and/or fine pulverization are also achieved rather than grinding.

Conventional rolling mills for grinding, however, are provided with two grinding rollers having a grinding gap found therebetween, and are loaded from above with the substance intended to be ground. Grinding rollers of such mills are usually made of metal. It is usual to use metal rollers in particular for grinding coffee. Such grinding rollers are usually structured on the surface. Grooves are preferably provided thereon. The loading operation is improved and the grinding is made more efficient by such grooves. It is also known to drive the grinding rollers such that the first grinding roller has a different rolling peripheral velocity from the second grinding roller. In such rolling mills for grinding, any adhesion of the substance to be ground should be directly prevented.

However the grooves and structures provided on the surface of the grinding rollers for a particularly efficient grinding of coffee are heavily stressed by dry grinding, and must be renewed at regular intervals, to at great expense.

BRIEF SUMMARY OF THE INVENTION

The present inventor has now determined that the taste of the coffee is adversely affected when ground with conventional grinding rollers.

It is therefore the objective of the present invention to provide a coffee mill, a method for grinding coffee, and a corresponding application thereof, respectively, which avoids any adverse effect on the taste of the coffee and at the same time makes it possible to grind the coffee efficiently, without requiring any wasteful work to renew the grinding rollers.

The objective is achieved by means of a roller mill for coffee, a method for dry-grinding coffee and a corresponding application thereof.

The objective of grinding coffee to a fine coffee powder with a particle size distribution with a D1-value of 100 pμ, in particular 70 μm or less is also achieved. The solution according to the present invention works even more efficiently in this range.

A roller mill for coffee according to the present invention for dry-grinding coffee comprises a first and a second grinding roller in parallel with each other, provided with a grinding gap arranged therebetween, in order to grind coffee, and a driving device for driving the first and second grinding rollers in opposition with a roller peripheral velocity ratio from 1:1.5 to 1:4. Herein, the grinding rollers comprise a surface made of granite.

By selecting an appropriate arrangement of the grinding rollers with a surface made of granite, it is possible to grind the coffee especially efficiently. The taste of the coffee is thereby not adversely affected. The grinding rollers, which are particularly associated with grinding into a fine coffee powder through intensive contact with the coffee, are taste-neutral when the surface is made out of granite.

Granite has hard and soft grain zones that are homogeneously distributed, and which wear out differently when dry-grinding coffee and provide the material with a better grip, such that any refurbishing is no longer necessary, as is known and required in the prior art.

Coupled with a high roller peripheral velocity difference, it becomes thereby possible to mill the coffee effectively without affecting the taste.

Herein the grinding gap is the gap found between the first and second grinding rollers. The width of the grinding gap is to be determined at the narrowest point of the grinding gap between the grinding rollers. The grinding rollers can be built entirely out of granite in a roller mill for coffee according to the present invention. However, it can be advantageous to provide only one surface out of granite. This can reduce costs and increase the longevity of the grinding rollers, when for example a softer core is provided opposite the granite surface. Numerous methods are known for producing such grinding rolls having a surface made out of granite for grinding or homogenizing pasty masses.

A driving device for driving the grinding rollers in opposite directions is understood to be a driving device which drives the grinding rollers such that the circumferences thereof move in the grinding gap in the same direction—that is, either upward or downward. This means that one grinding roller has to run clockwise and one counterclockwise. Any driving device can be used as the driving device. Here it is conceivable to use for example a gear drive, a belt or chain drive or a direct drive such as by an electric motor. Shear forces are generated by the difference in the peripheral velocities of the rollers.

The roller mill for coffee preferably comprises grinding rollers having a surface made out of fine-grained granite. Unlike grinding rollers having surfaces made out of coarse-grained granite, a particularly fine and uniform grinding can be achieved thereby.

The surface of the grinding roller mill is preferably built out of Haselberger granite. This granite has been found to be particularly advantageous for grinding coffee homogeneously and efficiently.

The grinding rollers of the roller mill for coffee preferably comprise a smooth surface. This presumes that the surface of the grinding rollers was not provided by structuring methods with special structures, as is usual for grinding rollers made out of metal in the prior art. The omission of such structuring not only makes the production easier but also obviates the otherwise necessary refurbishment of the structure.

Moreover, a particular efficient grinding can be achieved by using smooth grinding rollers especially for producing fine coffee powder with a D1-value less than or equal 100 μm (63% of particles smaller than 100 μm), in particular 70 μm.

The grinding gap preferably has a grinding gap width of 0.03 to 0.05 mm, especially for producing fine coffee powders.

By selecting the peripheral velocity of the rollers and the grinding gap width, the particle distribution of the ground powder and the efficiency of the grinding can be affected. A grinding gap in the above-mentioned range has been found to be particularly preferable.

The roller mill for coffee is preferably equipped so as to produce coffee powder having a D1-value of less than or equal 100 μm, in particularly less than or equal 70 μm. Such an adjustment can be achieved by one having ordinary skill in the art by selecting the grinding gap width and the peripheral velocity of the rollers. The roller mill for coffee according to the present invention is particularly efficient at producing such a fine coffee powder.

The objective is also achieved by a method for dry-grinding coffee comprising the steps of providing a first and a second grinding roller, arranging the first and second grinding rollers in parallel with a grinding gap between the first and the second grinding roller, driving the first and second grinding roller in opposite directions at a peripheral velocity ratio of the rollers of 1:1.5 to 1:4, and feeding in coffee into the grinding gap, in particular from above. Herein the first and second grinding rollers are selected so as to comprise a surface made out of granite. The above-mentioned advantages are obtained by such a method. Herein the coffee is preferably placed between the grinding rollers from above.

The method is particularly preferably operated such that the surfaces of the first and second grinding rollers are roughened by the grinding process. This is possible because the granite possesses homogeneously distributed hard and soft grain zones, which are worn out differently and thereby give the surface a certain roughness, which is caused by grinding the coffee.

Through such a slight roughening of the surface, it is possible to achieve a particularly favorable intake performance and a particularly effective grinding.

The objective is also achieved by an application, wherein a first and a second grinding roller arranged in parallel with one another with a grinding gap placed therebetween are used to grind coffee. Herein, the grinding rollers are driven in opposite directions at a peripheral velocity ratio of the rollers of 1:1.5 to 1:4. The grinding rollers used herein comprise a granite surface.

The above-described advantages can be achieved by means of such an application.

BRIEF DESCRIPTION OF THE SEVERAL VIEWS OF THE DRAWINGS

The present invention is exemplified below with reference to the purely schematic drawing.
Herein:

FIG. 1 shows a side view of a roller mill for coffee according to the present invention.

FIG. 1 shows a side view of the roller mill for coffee according to the present invention. A first grinding roller 1, a second grinding roller 2, a pouring device 5 and gear wheels 3 are to be noted.

DETAILED DESCRIPTION OF THE INVENTION

The first grinding roller 1 and the second grinding roller 2 are arranged such that a grinding gap 9 is formed therebetween. The first grinding roller 1 and the second grinding roller 2 are each mounted on a shaft around which they can turn. Furthermore, gear wheels 3 are provided to drive the grinding rollers 1, 2. The first grinding roller 1 is driven by the gear wheels in a first direction of rotation 6 and the second grinding roller 2 in a second direction of rotation 7. The first direction of rotation 6 and the second direction of rotation 7 are in opposite directions to one another. The first direction of rotation 6 is clockwise, whereas the second direction of rotation 7 is counterclockwise. Thus, the first direction of rotation 6 and the second direction of rotation 7 are selected such that the circumference of the first grinding roller 1 and of the second grinding roller 2 move in the same direction in the grinding gap 9. In the grinding gap 9, the circumference of the first grinding roller 1 and the circumference of the second grinding roller 2 each move downward. 0.04 mm is selected as the grinding gap width. The peripheral velocity ratio of the rollers is set at 1:3.

Coffee is supplied via the pouring device 5. This forms a coffee flow 8, which transports the coffee between the grinding rollers 1, 2 into the grinding gap 9. The coffee is ground therein.

Further advantageous embodiments can be found by the person having ordinary skill in the art and adapted to the task at hand.

LIST OF REFERENCES 1 first grinding roller
2 second grinding roller
3 gear wheel
4 shaft
5 pouring device
6 first direction of rotation
7 second direction of rotation
8 coffee flow
9 grinding gap

The invention claimed is:

1. A roller mill for coffee for dry-grinding coffee, comprising:
   a. a first and second grinding roller arranged in parallel with one another and with a grinding gap placed therebetween for grinding coffee; and
   b. a driving device for driving the first and second grinding rollers in opposite directions at a peripheral velocity ratio of the rollers of 1:1.5 to 1:4,
      wherein the first and second grinding roller each comprise a surface made out of granite which is smooth and which does not comprise any engraved structures, and
      the surface of each of the first and second roller is roughened by a grinding process so as to give the surface of the first and second roller a certain roughness.

2. The roller mill for coffee according to claim 1, wherein the surface comprises fine-grained granite.

3. The roller mill for coffee according to claim 1, wherein the granite is Haselberger granite.

4. The roller mill for coffee according to claim 1, wherein the grinding gap has a grinding gap width of 0.03 to 0.05 mm.

5. The roller mill for coffee according to claim 1, wherein the roller mill for coffee for grinding coffee into a coffee powder is provided with a D1-value of less than or equal 100 μm.

6. The roller mill for coffee according to claim 5, wherein the roller mill produces coffee powder in which 63% of the particles are less than 100 μm in size.

7. The roller mill for coffee according to claim 6, wherein the roller mill produces coffee powder in which 63% of the particles are less than or equal to 70 μm in size.

8. The roller mill for coffee according to claim 1, wherein the surface of the grinding rollers does not include any grooves.

9. A method for dry-grinding coffee, comprising the following steps:
 a. providing a first grinding roller and a second grinding roller;
 b. arranging the first and second grinding rollers in parallel with a grinding gap between the first and second grinding rollers;
 c. driving the first and second grinding rollers in opposite directions with a peripheral velocity ratio of the rollers of 1:1.5 to 1:4; and
 d. feeding the coffee into the grinding gap,
  wherein the first and second grinding roller each comprise a surface made out of granite which is smooth and which does not comprise any engraved structures, and
  the surface of each of the first and second roller is roughened by a grinding process so as to give the surface of the first and second roller a certain roughness.

10. The method according to claim 9, wherein the grinding gap is set at a grinding gap width of 0.03 to 0.05 mm.

11. The method according to claim 9, wherein the coffee is ground into a coffee powder with a D1-value less than or equal 100 μm by adjusting the grinding gap width and the peripheral velocities of the rollers.

12. The method according to claim 11, wherein the coffee is ground into a coffee powder where 63% of the particles are less than 100 μm in size, by adjusting the grinding gap width and the peripheral velocities of the rollers.

13. The method according to claim 12, wherein the coffee is ground into a coffee powder where 63% of the particles are less than or equal to 70 μm in size, by adjusting the grinding gap width and the peripheral velocities of the rollers.

14. The method according to claim 9, wherein the granite is Haselberger granite.

15. The method according to claim 9, wherein the surfaces of the grinding rollers do not comprise any grooves.

16. An application of a first and second grinding roller for grinding coffee arranged in parallel with one another and with a grinding gap placed therebetween, wherein the grinding rollers are driven in opposite directions with a peripheral velocity ratio of the rollers of 1:1.5 to 1:4, wherein the first and second grinding roller each comprise a surface made out of granite which is smooth and which does not comprise any engraved structures, and the surface of each of the first and second roller is roughened by a grinding process so as to give the surface of the first and second roller a certain roughness.

* * * * *